US008076254B2

United States Patent
Jorge et al.

(10) Patent No.: US 8,076,254 B2
(45) Date of Patent: *Dec. 13, 2011

(54) SINTERED REFRACTORY BLOCK BASED ON SILICON CARBIDE WITH A SILICON NITRIDE BOND

(75) Inventors: Eric Jorge, Courbevoie (FR); Olivier Marguin, Caumont-sur-Durance (FR)

(73) Assignee: Saint-Gobain Centre de Recherches et d'Etudes Europeen, Courbevoie (FR)

( * ) Notice: Subject to any disclaimer, the term of this patent is extended or adjusted under 35 U.S.C. 154(b) by 905 days.

This patent is subject to a terminal disclaimer.

(21) Appl. No.: 11/791,653

(22) PCT Filed: Nov. 25, 2005

(86) PCT No.: PCT/FR2005/002936
§ 371 (c)(1),
(2), (4) Date: Jun. 28, 2007

(87) PCT Pub. No.: WO2006/056698
PCT Pub. Date: Jun. 1, 2006

(65) Prior Publication Data
US 2007/0264576 A1   Nov. 15, 2007

(30) Foreign Application Priority Data
Nov. 29, 2004   (FR) ..................... 04 12627

(51) Int. Cl.
*C04B 35/567* (2006.01)
*C04B 35/586* (2006.01)

(52) U.S. Cl. ........ 501/92; 501/96.3; 501/97.4; 264/647; 264/682

(58) Field of Classification Search .................. 501/92, 501/96.3, 97.4; 264/647, 682
See application file for complete search history.

(56) References Cited

U.S. PATENT DOCUMENTS

| | | | | |
|---|---|---|---|---|
| 2,752,258 | A | 6/1956 | Swentzel | |
| 3,960,577 | A * | 6/1976 | Prochazka | ..................... 252/504 |
| 3,968,194 | A * | 7/1976 | Prochazka | ..................... 264/122 |
| 6,143,239 | A | 11/2000 | Sonntag | |
| 7,494,949 | B2 * | 2/2009 | Kinoshita et al. | ............... 501/92 |
| 2005/0008878 | A1 | 1/2005 | Bryden | |
| 2006/0281625 | A1 * | 12/2006 | Kinoshita et al. | ............... 501/92 |
| 2007/0264576 | A1 | 11/2007 | Jorge et al. | |

FOREIGN PATENT DOCUMENTS

| | | |
|---|---|---|
| CN | 1472174 A | 2/2004 |
| EP | 0 417 292 B1 | 3/1991 |
| GB | 728306 | 4/1955 |
| JP | 58-91070 | 5/1983 |
| JP | 60-260197 | 12/1985 |
| JP | 03-223166 | 10/1991 |

(Continued)

OTHER PUBLICATIONS

Derwent abstract of JP 58091070, May 1983.*

(Continued)

*Primary Examiner* — Karl Group
(74) *Attorney, Agent, or Firm* — Young & Thompson

(57) ABSTRACT

A sintered refractory block based on silicon carbide (SiC) with a silicon nitride (Si3N4) bond, for the manufacture of a aluminium electrolysis vessel, characterized in that it comprises, expressed in percentage by weight, at least 0.05% boron and/or between 0.05 and 1.2% calcium.

25 Claims, 1 Drawing Sheet

FOREIGN PATENT DOCUMENTS

| JP | 2000-302554 | | 10/2000 |
|---|---|---|---|
| SU | 975686 | * | 11/1982 |
| WO | WO 2006/056698 A2 | | 6/2006 |

OTHER PUBLICATIONS

Notification of the Second Chinese Office Action dated Mar. 1, 2010.

Edwards, D.P. et al.: "The Development of Microstructure in Silicon Nitride-Bonded Silicon Carbide" Journal of the European Ceramic Society, Elsevier Science Publishers, Barking, Essex, GB, vol. 15, No. 5, 1995, pp. 415-424.

Fickel, A.F. et al.: "On the technological potential of SiC-TiB2-Si3N4 compounds in A1-electrolysis cells" Light Met; Light Metals: Proceedings of Sessions, TMS Annual Meeting, published by Minerals, Metals & Materials Soc (TMS) Warrendale, PA, 1994, pp. 493-499.

Reddy, N. K., "Influence of infiltrants on the electrical resistivity of silicon nitride bonded silicon carbide refractories" Journal of Materials Science Letters Kluwer Academic Publishers USA, vol. 18, No. 11 Jun. 1, 1999, pp. 869-871.

International Search Report dated Jun. 5, 2009.

* cited by examiner

SINTERED REFRACTORY BLOCK BASED ON SILICON CARBIDE WITH A SILICON NITRIDE BOND

BACKGROUND OF THE INVENTION

1. Field of the Invention

The invention relates to novel sintered refractory blocks, especially for the construction of aluminum electrolysis cells, to a method of manufacturing them, and to a cell comprising said blocks.

2. Description of the Related Art

As can be seen in FIG. 1, aluminum metal 2 may be produced on an industrial scale by electrolyzing alumina in solution in a bath 10 based on molten cryolite. The electrolyte bath 10 is conventionally contained in an electrolysis cell 12. The cell 12 comprises a side wall 14 and a bottom 16. The bottom 16 is composed of refractory bottom blocks 17 and cathode blocks 24 and insulating blocks in the lower portion. The side wall 14 is formed from refractory side blocks 18 surrounded by a metal casing 20.

The dimensions of a refractory side block 18 can vary. They are conventionally more than 30×100×100 mm [millimeter] and may attain 120×300×300 mm.

The composition of the blocks 18 may be based on carbon (graphite and/or anthracite). Typically, the mortar for the blocks 18 is a refractory cement 21 disposed between them and against the metal envelope 20. The cell 12 comprises at least one anode 22 and at least one cathode 24. The anodes 22 and cathodes 24 are disposed so as to be in contact with the molten metal bath, the cathode 24 conventionally being disposed close to the bottom 16.

When the electrodes 22 and 24 are placed under voltage, an electrolysis reaction occurs in the bath 10, resulting in the formation of a bath of aluminum in the cell, which bath is deposited on the cathode.

Passing high electric current through the bath 10 also causes heat to be released under the Joule effect. Evacuating that heat through the wall 14 of the cell 12 causes a layer 26 of solidified cryolite to be deposited on the inner surface 27 of the blocks 18. That layer is termed a "self-lining" layer.

The blocks 18 must protect the metal envelope 20 and allow sufficient heat to be evacuated to ensure temperature stabilization of the molten bath 10. In particular, it is vital to avoid reaching temperatures beyond which the self-lining layer 26 of solidified cryolite liquefies again and could contribute to very rapid corrosion of the sides of the cell. Further, the blocks 18 are often exposed to corrosive environments (very hot liquid metal, molten cryolite in the lower portion, corrosive gas in the upper portion), and they are subjected to high temperatures and large thermal and mechanical stresses.

To meet those challenges, blocks are known that are based on silicon carbide granulates which have generally satisfactory resistance to attack. Conventionally, silicon carbide granulates are sintered at a temperature in the range 1600° C. to about 2000° C. Sintering fine grained silicon carbide granulates at very high temperatures (2150° C.) is also known, enabling boron and carbon to be added. However, silicon carbide is very difficult to sinter and/or its cost is prohibitive. Further, the format of the sintered silicon carbide blocks is limited, especially due to a great deal of shrinkage on firing.

Blocks based on dense sintered silicon carbide granulates are also known, with less than 1% of $B_4C$ and C, for example Hexolloy SiC®. However, they are currently extremely expensive.

Finally, blocks based on silicon carbide (SiC) are known, bound by a matrix of silicon nitride ($Si_3N_4$). The materials for such blocks were developed at the end of the 1970s and are described, for example, in U.S. Pat. No. 2,752,258. They improve the compromise between oxidation resistance, mechanical strength (erosion), and thermal conductivity compared with carbon blocks. The improvement in abrasion resistance is particularly advantageous at the bottom of the cell where the bath, which moves under the effect of magnetic fields, may cause a great deal of abrasion.

Said blocks are obtained by reactive sintering of a mixture of silicon carbide and silicon, with nitrogen deriving from firing in a nitrogen atmosphere.

To gain useful volume and facilitate heat evacuation, research has been concentrated on reducing the thickness of such blocks. However, the thickness cannot be reduced without affecting the service life of the cells. Thus, it must be accompanied by an improvement in the oxidation resistance and resistance to attack by the cryolite bath. That need is greater if the stresses on the refractory blocks are higher. In particular, electrolysis cells are now used with a current of more than 200,000 amps and from which, as a result, a great deal of heat must be evacuated, large quantities of oxidizing gas are generated, and the self-lining layer may become unstable.

Thus, there is a need for a novel refractory block based on silicon carbide (SiC) with a nitride binder ($Si_3N_4$) that can effectively and durably resist the thermal and/or chemical stresses that may be produced in an aluminum electrolysis cell, in particular in the side wall thereof.

SUMMARY OF THE INVENTION

The invention aims to answer this need.

According to the invention, this aim is achieved by means of a sintered refractory block based on silicon carbide (SiC) with a silicon nitride ($Si_3N_4$) binder, in particular intended for fabricating an aluminum electrolysis cell, which block is remarkable in that it includes, as a percentage by weight, a total calcium and boron content in the range 0.05% to 1.5%, preferably 1.2%. Preferably, it includes at least 0.05%, preferably at least 0.3%, and more preferably at least 0.5% of boron, and/or in the range 0.05% to 1.2% of calcium.

Surprisingly, the inventors have discovered that the presence of boron and/or calcium provides a substantial improvement in properties as regards aluminum electrolysis cell applications, in particular resistance to oxidation and to attack by the cryolite bath, and dimensional stability under oxidation conditions.

The refractory block of the invention also exhibits one or more of the following preferred characteristics:

- the refractory block includes less than 3% of boron, as a percentage by weight;
- silicon nitride ($Si_3N_4$) in the beta form represents, as a percentage by weight, at least 40%, preferably at least 60%, and more preferably at least 80%, of all of the silicon nitride ($Si_3N_4$) in the beta form and in the alpha form;
- the $Si_2ON_2$ content, as a percentage by weight, is less than 5%, preferably less than 2%;
- the porosity of the sintered block is preferably 10% or more; and
- the boron is not in the $TiB_2$ form, as that form of titanium is not stable in contact with molten cryolite, in an oxidizing atmosphere. Further, $TiB_2$ is also unstable towards aluminum.

Preferably again, the $Si_3N_4$/SiC weight ratio is in the range 5% to 45%, preferably in the range 10% to 20%, i.e. in the range 0.05 to 0.45, preferably in the range 0.1 to 0.2.

Preferably, the $Si_3N_4$/SiC ratio is less than 0.3 and/or more than 0.05. Further, the $Si_3N_4$ content is preferably 11% or more, as a percentage by weight.

The invention also provides an electrolysis cell including a side wall comprising a plurality of refractory blocks, at least one of said blocks being in accordance with the invention. Preferably, all of the blocks forming the side wall of the cell of the invention are in accordance with the invention.

Finally, the invention provides a method of fabricating a refractory block in accordance with the invention, comprising the following steps in succession:

a) preparing a charge comprising a particulate mixture comprising a silicon carbide granulate and at least one boron and/or calcium compound, a binder optionally being added to said particulate mixture;

b) forming said charge in a mold;

c) compacting said charge in the mold to form a preform;

d) unmolding said preform;

e) drying said preform, preferably in air or a moisture-controlled atmosphere; and f) firing said preform in a reducing atmosphere of nitrogen at a temperature in the range 1100° C. to 1700° C.

The inventors have discovered that adding boron and/or calcium to the formulations improves the properties of sintered silicon carbide (SiC) based refractory blocks with a silicon nitride binder ($Si_3N_4$) which are obtained. In particular, the resistance to corrosion by fluorine-containing products and molten cryolite is improved.

The method of the invention also has one or more of the following preferred characteristics:

said boron and/or calcium compound contains boron;

said boron and/or calcium compound is added in a predetermined quantity so that the refractory block obtained at the end of step f) is in accordance with the invention, in particular so that it comprises, as a percentage by weight, at least 0.05%, preferably at least 0.3%, more preferably at least 0.5% of boron, and/or less than 3% of boron;

said boron and/or calcium compound is free of oxygen, i.e. added in a "non-oxide form";

said boron compound is selected from the group formed by oxides, carbides, nitrides, fluorides and metal alloys containing boron, in particular $B_4C$, $CaB_6$, $H_3BO_3$, and BN, preferably from the group formed by $B_4C$ and $CaB_6$. More preferably, said boron compound is $CaB_6$;

said calcium compound is selected from the group formed by oxides, carbides, nitrides, fluorides and metal alloys containing calcium, preferably selected from $CaB_6$, CaSi, $CaSiO_3$, and $CaCO_3$;

said calcium compound is added in a predetermined quantity such that the calcium content of the refractory block obtained at the end of step f) is in the range 0.05% to 1.2%, as a percentage by weight.

BRIEF DESCRIPTION OF THE DRAWING FIGURES

Other characteristics and advantages of the present invention become apparent from the following description, made with reference to the accompanying drawings in which.

DETAILED DESCRIPTION OF THE INVENTION

Figure 1:
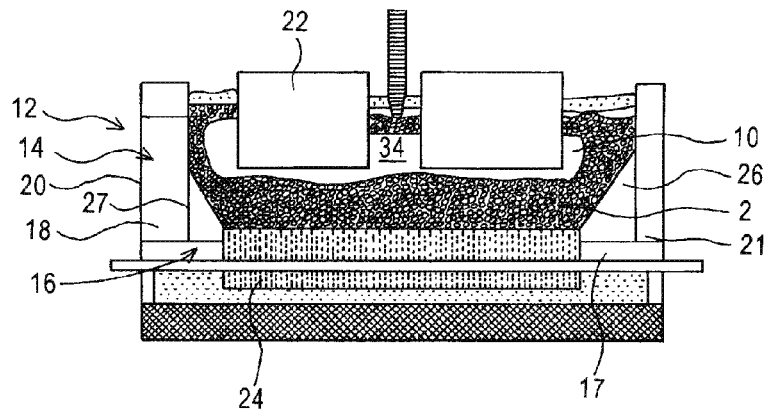
FIG. 1 is a diagrammatic representation of an electrolysis cell in cross section along a substantially medial plane.

Unless otherwise indicated, all of the percentages in the present description are percentages by weight.

When a granulate is said to be "based on" a constituent, this means that said granulate comprises more than 50% by weight of that constituent.

Known methods of fabricating refractory blocks may be employed to fabricate a block in accordance with the invention, provided that at least one oxygen-free boron compound is added to the starting charge.

Preferably, the method employed comprises the following steps:

a) preparing a charge comprising a particulate mixture comprising a silicon carbide granulate and at least one boron and/or calcium compound, a binder being added to said particulate mixture;

b) forming said charge in a mold;

c) compacting said charge in the mold to form a preform;

d) unmolding said preform;

e) drying said preform, preferably in air or a moisture-controlled atmosphere, using conventional preform fabrication procedures; and f) firing said preform in a reducing atmosphere of nitrogen at a temperature of 1100° C. to 1700° C., and drying.

In step a), the particulate mixture preferably comprises, as a percentage by weight, 30% to 90% of refractory grains wherein at least 90% have a size in the range 50 µm [micrometer] to 5 mm [millimeter], and 10% to 60% of at least one refractory powder wherein at least 90% of the particles have a diameter of less than 200 µm. Advantageously, said granulometric distribution can endow the fabricated block with optimum cohesion.

The boron may be supplied in a particulate form or in any other form provided that the maximum moisture content of the mixture remains below 7%, preferably below 5%.

The function of the binder is to form with the particulate mixture a mass that is sufficiently rigid to preserve its shape until step e). The choice of binder depends on the desired shape. Because of the binder, the mass may advantageously take the form of a layer of varying thickness, which can follow the wall of the mold, to form blocks.

Any known binder or mixture of known binders may be used. The binders are preferably "temporary", i.e. they are completely or partially eliminated during the block drying and firing steps. More preferably, at least one of the temporary binders is a solution of modified starch derivatives, an aqueous solution of dextrin or of lignone derivatives, a solution of a processing agent such as polyvinyl alcohol, a phenol resin or another epoxy type resin, a furfuryl alcohol, or a mixture thereof. More preferably, the quantity of temporary binder is in the range 0.5% to 7% by weight relative to the particulate mixture of the charge.

Pressing additives as are conventionally used in fabricating sintered blocks may be added to the particulate mixture and the binder. Said additives comprise plasticizers, for example modified starches or polyethylene glycols and lubricants, for example soluble oils or stearate derivatives. The quantities of such additives are those conventionally used when fabricating sintered silicon carbide (SiC) based refractory blocks with a silicon nitride binder ($Si_3N_4$).

Mixing of the charge is continued until a substantially homogeneous mass is obtained.

In step b), the charge is shaped and placed in a mold.

In the next compaction or "pressing" step c), the contents of the mold are compressed by applying a force to the upper surface of the charge which can transform it into a preform that is capable of being sintered. A specific pressure of 300 kg/cm² [kilogram/square centimeter] to 600 kg/cm² is appropriate. Pressing is preferably carried out uniaxially or isostatically, for example using a hydraulic press. It may advantageously be preceded by a manual or pneumatic and/or vibrational ramming operation.

Next, the preform is unmolded (step d)), then dried (step e)). Drying can be carried out at a moderately high temperature. Preferably, it is carried out at a temperature in the range 110° C. to 200° C. It conventionally lasts between 10 hours and one week, depending on the format of the preform, until the residual moisture content of the preform is less than 0.5%.

The dried preform is then fired (step f)). The firing period, between about 3 and 15 days cold to cold, depends on the materials and also on the size and shape of the block. In accordance with the invention, firing is carried out in nitrogen in order to form the nitride by reactive sintering, which nitride acts as the ceramic binder for the grains. The firing cycle is preferably carried out at a temperature in the range 1100° C. to 1700° C. During firing, nitrogen reacts with certain of the constituents of the particulate mixture of the charge to form a matrix of silicon nitride which can bind the grains of said charge, in particular grains of silicon carbide. A monolithic block is produced.

In the various tests below, provided by way of non-limiting illustration, the particle size of the powders used as additives ($B_4C$, $CaB_6$, and $CaSiO_3$) is less than 45 µm. Their respective contents in the starting composition are indicated in Table 1.

Metallic silicon is also added in the proportion indicated in Table 1.

"Black" or "refractory" silicon carbide with different granulometric fractions, sold by Saint-Gobain Ceramic Materials, was also used. This material is essentially constituted by alpha SiC and has a mean chemical analysis, by weight, of 98.5% of SiC.

Table 1 also shows the results of various tests carried out to characterize the products of the invention compared with the reference product (Refrax® type product). All of the measurements were carried out on the core of the specimens.

The nitrogen (N) contents in the products were measured using LECO (LECO TC 436 DR; LECO CS 300) type analyzers. The values given are percentages by weight.

The boron (B) and calcium (Ca) contents in the products were measured by X-ray fluorescence spectrometry. The values given are percentages by weight.

The oxidation tests were carried out in accordance with ASTM C863. To reproduce the oxidation conditions experienced by the blocks of an aluminum electrolysis cell, the specimens (typically with a size of 25×25×120 mm) underwent a test of at least 100 hours at 900° C. in an atmosphere saturated with steam. Oxidation generates an increase in mass ("Om" value, given as a percentage) and/or in volume ("Ov", given as a percentage), which results from the transformation of the silicon nitride and carbide into silica. The increases in mass and volume were thus indicators of the degree of oxidation. Two materials were considered to be different when their oxidation indicators differed by at least 1% (mean over 3 test specimens).

The variation in open porosity due to plugging by the oxidation products of the reaction was also a measure allowing the degree of oxidation to be determined. The open porosity was measured in accordance with International Standard ISO5017 ("PO-Ox" value, given as a percentage).

The corrosion resistance test allowed the behavior of 25 mm×25 mm cross section specimens which had already undergone the oxidation test to be determined. These specimens were kept at 1030° C. for 22 hours in a bath of molten cryolite. Their corroded length was then measured, i.e. the reduction in their length resulting from corrosion. The value "Ic" provides, as a percentage, the ratio between the corroded length of the test specimen and the corroded length of a reference specimen. The lower the Ic, the better the corrosion resistance.

The crystalline phases present in the refractory products were determined by X ray diffraction. Principally, it was found that silicon nitride $Si_3N_4$ as well as an oxynitride phase, $Si_2ON_2$, were present. The amounts of these phases, as a percentage by weight, are indicated in Table 1. The complement was SiC.

The apparent specific gravity of the products of the invention was in the range 2.4 to 2.7. That of the reference product was 2.6.

The silicon nitride could be in the alpha or beta form. The alpha phase was present in the form of a tangle of silicon nitride fibrils, while the beta phase was in the form of grains with a variable shape.

Analyses carried out over several years by the Applicant have shown that silicon nitride in the beta form is less sensitive to rapid combustion because of its lower specific surface area, than is silicon nitride in the alpha form. During rapid combustion, silicon nitride is oxidized and produces silica which is "consumed" by the molten cryolite. Those reactions thus result in an increase in the porosity and connectivity of the pores, facilitating the penetration of corrosive materials. Thus, it is advantageous to encourage the formation of the beta form to improve the resistance to attack by molten cryolite.

However, it is known that enrichment of the beta silicon nitride phase is generally accompanied by an enrichment in the oxynitride phase $Si_2ON_2$.

However, silicon oxynitride, like residual silicon and Sialon with alumina impurities, conventionally generated during a nitriding process, are unwanted phases which have a lower resistance to cryolite compared with that of silicon nitride, regardless of the form of the silicon nitride. Thus, it is advantageous to limit the quantities thereof.

The inventors have discovered that adding boron and/or calcium, preferably in an oxygen-free form, to the starting charge advantageously stimulates the transformation into beta silicon nitride during the process for nitriding silicon carbides with a nitride binder, without causing deleterious enrichment of the $Si_2ON_2$ oxynitride phase. Table 1 below illustrates this discovery.

In accordance with the invention, a boron compound is thus added, preferably in a non-oxide form. Advantageously, this addition results in almost complete transformation into beta silicon nitride without major enrichment of the oxynitride phase $Si_2ON_2$.

TABLE 1

| N° | Composition | | | | | Analysis | | | | | | | | | | | |
|---|---|---|---|---|---|---|---|---|---|---|---|---|---|---|---|---|---|
| | Si | B₄C | CaB₆ | H₃BO₃ | CaCO₃ | PO | N | B | Ca | Si₃N₄ a | Si₃N₄ b | b/a | Si₂ON₂ | Om | Ov | PO-Ox | Ic |
| R | 13.5 | 0 | 0 | 0 | 0 | 17.2 | 5.9 | 0.0 | 0.1 | 12 | 5 | 29 | 3 | 1.6 | 1.0 | 14.0 | 100 |
| 1 | 13.5 | 0.2 | 0.0 | 0.0 | 0.0 | 16.2 | 6.4 | 0.1 | 0.1 | 10 | 9 | 47 | 3 | 2.4 | 0.0 | 9.4 | 45 |
| 2 | 11.8 | 0.5 | 0.0 | 0.0 | 0.0 | 17.1 | 7.4 | 0.5 | 0.1 | 8 | 9 | 53 | 3 | 2.7 | 0.1 | 9.5 | ND |
| 3 | 13.5 | 0.5 | 0.0 | 0.0 | 0.0 | 15.5 | 6.1 | 0.4 | 0.2 | ND | ND | ND | ND | 1.3 | 0.0 | 8.6 | 65 |
| 4 | 10.0 | 0.8 | 0.0 | 0.0 | 0.0 | 16.8 | 5.5 | 0.6 | 0.1 | 7 | 7 | 50 | ND | 2.5 | 0.0 | 6.7 | 61 |
| 5 | 13.5 | 0.8 | 0.0 | 0.0 | 0.9 | 16.3 | 7.1 | 0.5 | 0.4 | 1 | 14 | 93 | 4 | 1.5 | 0.0 | 10.0 | 41 |
| 6 | 13.5 | 0.8 | 0.0 | 0.0 | 0.0 | 16.1 | 7.0 | 0.5 | 0.0 | 2 | 14 | 88 | 4 | 1.9 | 0.1 | 9.4 | 41 |
| 7 | 13.5 | 0.8 | 0.0 | 0.0 | 0.0 | 16.1 | 7.1 | 0.6 | 0.1 | 7 | 10 | 59 | 2 | 2.4 | 0.1 | 6.2 | 45 |
| 8 | 14.3 | 0.8 | 0.0 | 0.0 | 0.0 | 16.1 | 7.0 | 0.5 | 0.0 | 1 | 14 | 93 | 4 | 2.0 | 0.1 | 9.5 | 41 |
| 9 | 13.5 | 1.0 | 0.0 | 0.0 | 0.0 | 15.2 | 6.1 | 0.6 | 0.2 | ND | ND | ND | ND | 1.5 | 0.1 | 7.6 | 72 |
| 10 | 13.5 | 1.6 | 0.0 | 0.0 | 0.0 | 16.1 | 6.9 | ND | 0.2 | 2 | 17 | 89 | 0 | 2.2 | 0.2 | 7.1 | 70 |
| 11 | 14.3 | 1.6 | 0.0 | 0.0 | 0.0 | 17.0 | 7.2 | 1.0 | 0.1 | 1 | 14 | 93 | 4 | 2.3 | 0.0 | 7.3 | 70 |
| 12 | 13.5 | 3.0 | 0.0 | 0.0 | 0.0 | 13.6 | 4.5 | 1.9 | 0.2 | ND | ND | ND | ND | 1.4 | 0.0 | 8.3 | 60 |
| 13 | 14.3 | 5.0 | 0.0 | 0.0 | 0.0 | 14.1 | 8.1 | 2.9 | 0.1 | 1 | 14 | 93 | 4 | 1.7 | 0.3 | 5.1 | 73 |
| 14 | 13.5 | 0.0 | 0.0 | 3.5 | 0.0 | 20.0 | 7.1 | 0.4 | 0.1 | 2 | 9 | 82 | 7 | 1.0 | 0.0 | 13.5 | 86 |
| 15 | 13.5 | 0.0 | 0.0 | 3.5 | 0.9 | 20.0 | 7.8 | 0.4 | 0.4 | 2 | 13 | 87 | 7 | 1.4 | 0.3 | 16.4 | 88 |
| 16 | 13.5 | 0.0 | 0.0 | 0.0 | 2.0 | 19.1 | 6.7 | ND | 1.0 | 9 | 9 | 100 | 0 | 1.5 | 0.9 | ND | 75 |
| 17 | 13.5 | 0.0 | 0.2 | 0.0 | 0.0 | 16.6 | 7.3 | 0.1 | 0.2 | 8 | 10 | 56 | 2 | 1.9 | 0.2 | 10.3 | 45 |
| 18 | 13.5 | 0.0 | 0.5 | 0.0 | 0.0 | 14.3 | 5.8 | 0.3 | 0.5 | ND | ND | ND | ND | 1.0 | 0.0 | 8.3 | ND |
| 19 | 13.5 | 0.0 | 1.0 | 0.0 | 0.0 | 16.4 | 7.7 | 0.3 | 0.4 | 1 | 18 | 95 | 0 | 1.6 | 0.3 | 11.3 | 35 |
| 20 | 13.5 | 0.0 | 1.0 | 0.0 | 0.0 | 15.6 | 7.1 | 0.6 | 0.5 | 3 | 15 | 83 | 3 | 1.7 | 0.0 | 7.7 | 47 |
| 21 | 13.5 | 0.0 | 3.0 | 0.0 | 0.0 | 14.3 | 6.0 | 1.1 | 1.4 | ND | ND | ND | ND | 2.0 | 0.0 | 7.5 | ND |

Table 1 indicates that adding boron and/or calcium can improve the corrosion resistance of refractories formed from silicon carbide with a $Si_3N_4$ matrix binder.

Table 1 indicates that adding boron and/or calcium can advantageously enhance the proportion of beta phase $Si_3N_4$. However, only adding boron and/or calcium in a non oxide form can limit the amount of silicon oxynitride $Si_2ON_2$ to values close to or lower than that of the reference product, as can be seen in Examples 14 and 15.

Table 1 indicates that the open porosity is improved when the amount of boron in the final product is non zero: only examples 14, 15 and 16 have an open porosity that is greater than that of the reference product. For this reason, products containing 0.05% to 3% of boron are preferred.

Further, Table 1 shows that the presence of boron compounds in the starting charge advantageously catalyzes the nitriding reaction (the amount of nitrogen in the products of the invention is enhanced).

Without wishing to be bound by a theory, the inventors have a partial explanation for the improvement in corrosion resistance, namely stabilization of oxidation degradation. As indicated in Table 1 and shown in FIG. 2, the oxidation resistance of the products of the invention is improved.

Table 1 shows that the variation in volume due to oxidation is very limited in the products of the invention. Further, the increase in mass after oxidation is limited when the calcium that is added is combined with boron. Thus, adding $CaB_6$ is advantageous, in particular in amounts between 0.5% and 2%.

Figure 2:
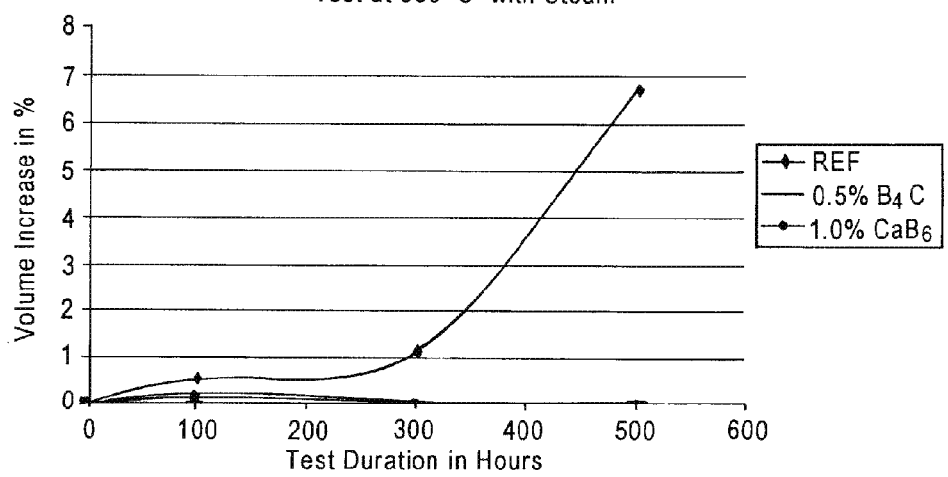
FIG. 2 represents in the form of graphs, the percentage variation in the increase in volume due to oxidation as a function of time for different blocks tested in accordance with American Standard ASTM C863 at 900° C.

FIG. 2 shows the change in the resistance to oxidation when the test is extended to 500 hours. The improvement over the reference is confirmed and accentuated.

Table 1 shows that adding boron and/or calcium has an influence on corrosion resistance even for small amounts. It also appears that a minimum amount of 0.8% by weight can produce a substantially maximum corrosion resistance.

Preferably, the percentage by weight of $CaB_6$ in the starting charge is more than 0.5%.

It appears that the effect of adding $B_4C$ to the starting charge is substantially the same at $B_4C$ contents as low as 0.2%. A reinforced effect is obtained with a content of 0.6%.

Clearly, the present invention is not limited to the implementations described and shown by way of non limiting illustrative examples.

The inventors have also observed that adding boron in the non oxide form, and more specifically $CaB_6$ or $B_4C$, also contributes to increasing the thermal diffusivity of the products of the invention, without a specific effect linked to compactness. This is clearly very important in encouraging heat transfer.

Further, it has been found that none of the products of the invention contains $Si_3N_4$ in the acicular form, including on the surface.

The oxidation performance of the products of the invention indicates that applications other than in electrolysis cells may be envisaged.

The invention claimed is:

1. A refractory block based on silicon carbide (SiC) reactively sintered between 1100° C. and 1700° C. to form a silicon nitride binder ($Si_3N_4$), including a boron compound, the boron compound being selected from the group consisting of $CaB_6$ and oxides, carbides, nitrides, fluorides containing boron, a percentage by weight of boron being in a range of 0.05% to 1.5%, and a $Si_3N_4$/SiC weight ratio being in a range of 0.05 to 0.45, a porosity of the sintered block being 10% or more.

2. The sintered refractory block according to claim 1, in which the percentage by weight of boron is in the range 0.05% to 1.2%.

3. The sintered refractory block according to claim 1, in which the $Si_3N_4$/SiC weight ratio is in the range 0.1 to 0.2.

4. The sintered refractory block according to claim 1, in which the silicon nitride ($Si_3N_4$) in a beta form represents, as a percentage by weight, at least 40% of the whole of the silicon nitride ($Si_3N_4$) in the beta form and in an alpha form.

5. The sintered refractory block according to claim 4, in which the silicon nitride ($Si_3N_4$) in the beta form represents, as a percentage by weight, at least 80% of the whole of the silicon nitride ($Si_3N_4$) in the beta form and in the alpha form.

6. The sintered refractory block according claim 1, in which an amount of $Si_2ON_2$, as a percentage by weight, is less than 5%.

7. The sintered refractory block according to claim 6, in which the amount of $Si_2ON_2$, as a percentage by weight, is less than 2%.

8. The sintered refractory block according to claim 1, in which the $Si_3N_4$ content is 11% or more, as a percentage by weight.

9. The sintered refractory block according to claim 1, including a mixture of boron and calcium, a total amount of calcium and boron being in a range of 0.05% to 1.5%.

10. The sintered refractory block according to claim 9, in which a percentage by weight of calcium is in a range of 0.05% to 1.2%.

11. The sintered refractory block according to claim 1, including calcium and in which a percentages by weight of calcium is in a range of 0.05% to 1.2% respectively.

12. The sintered refractory block according to claim 11, in which the silicon nitride ($Si_3N_4$) in a beta form represents, as a percentage by weight, at least 80% of the whole of the silicon nitride ($Si_3N_4$) in the beta form and in an alpha form.

13. The sintered refractory block according to claim 2, in which an amount of $Si_2ON_2$, as a percentage by weight, is less than 5%.

14. The sintered refractory block according to claim 13, in which the $Si_3N_4$/SiC weight ratio is in the range 0.1 to 0.2.

15. The sintered refractory block according to claim 14, in which the silicon nitride ($Si_3N_4$) in a beta form represents, as a percentage by weight, at least 80% of the whole of the silicon nitride ($Si_3N_4$) in the beta form and in an alpha form.

16. The sintered refractory block according to claim 1, including at least 0.3% by weight of boron, as a percentage by weight.

17. A refractory block sintered between 1100° C. and 1700° C. based on silicon carbide (SiC) with a silicon nitride binder ($Si_3N_4$), at least one boron compound, and optionally at least one calcium compound, the boron compound being selected from the group consisting of $CaB_6$ and oxides, carbides, nitrides, fluorides containing boron, a total amount of calcium and boron being in a range of 0.05% to 1.5%, a $Si_3N_4$/SiC weight ratio being in a range of 0.1 to 0.2, a porosity of the sintered material being 10% or more.

18. A method of fabricating a refractory block based on silicone carbide (SiC), with a silicon nitride binder ($Si_3N_4$), intended in particular for fabricating an aluminum electrolysis cell, said method comprising the following steps in succession:
a) preparing a charge comprising a particulate mixture comprising a silicon carbide granulate, silicon and at least one boron compound, and optionally at least one calcium compound, the boron compound being selected from the group consisting of $CaB_6$ and oxides, carbides, nitrides, fluorides containing boron, a binder optionally being added to said particulate mixture;
b) forming said charge in a mold;
c) compacting said charge in the mold to form a preform;
d) unmolding said preform;
e) drying said preform, preferably in air or a moisture-controlled atmosphere; and
f) firing said preform in a reducing atmosphere of nitrogen at a temperature in the range 1100° C. to 1700° C.;
wherein said silicon is able to react during step f) so as to generate $Si_3N_4$, said boron and/or calcium compound being added in a quantity which is determined such that the refractory block obtained at the end of step f) includes a total amount of calcium and boron in a range 0.05% to 1.5%.

19. The fabrication method according to claim 18, in which said boron compound is selected from the group consisting of $B_4C$, $CaB_6$, $H_3BO_3$, and BN.

20. The fabrication method according to the claim 19, in which said boron compound is selected from the group consisting of $B_4C$ and $CaB_6$.

21. The fabrication method according to claim 20 in which said boron and/or calcium compound is $CaB_6$.

22. The fabrication method according to claim 18, in which said boron and/or calcium compound is free of oxygen.

23. The fabrication method according to claim 18, in which said calcium compound is selected from the group consisting of oxides, carbides, nitrides, fluorides, and metal alloys containing calcium.

24. The refractory block obtained according to a fabrication method according to claim 18 and having a porosity of 10% or more.

25. An electrolysis cell having a side wall comprising a plurality of refractory blocks, wherein at least one of said blocks is in accordance with claim 1.

* * * * *